(12) United States Patent
Bhandare et al.

(10) Patent No.: US 11,385,483 B2
(45) Date of Patent: Jul. 12, 2022

(54) LINEARIZATION AND REDUCTION OF MODULATED OPTICAL INSERTION LOSS FOR QUADRATURE OPTICAL MODULATOR

(71) Applicant: II-VI DELAWARE, INC., Wilmington, DE (US)

(72) Inventors: Suhas P. Bhandare, Chalfont, PA (US); Daniel Mahgerefteh, Sunnyvale, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/950,671

(22) Filed: Nov. 17, 2020

(65) Prior Publication Data
US 2021/0072566 A1  Mar. 11, 2021

Related U.S. Application Data

(62) Division of application No. 16/559,962, filed on Sep. 4, 2019, now Pat. No. 10,871,662.

(60) Provisional application No. 62/727,979, filed on Sep. 6, 2018.

(51) Int. Cl.
*G02F 1/21* (2006.01)
*G02F 1/01* (2006.01)

(52) U.S. Cl.
CPC .......... *G02F 1/0123* (2013.01); *G02F 1/0136* (2013.01); *G02F 1/21* (2013.01); *G02F 1/212* (2021.01)

(58) Field of Classification Search
None
See application file for complete search history.

(56) References Cited

U.S. PATENT DOCUMENTS

| | | | |
|---|---|---|---|
| 2008/0260237 A1 | 10/2008 | Savolainen et al. | |
| 2014/0010530 A1* | 1/2014 | Goebuchi | H04B 10/54 398/25 |
| 2016/0056896 A1* | 2/2016 | Toya | H04B 10/588 398/183 |
| 2016/0337042 A1 | 11/2016 | Zhang et al. | |
| 2017/0134096 A1 | 5/2017 | Zheng et al. | |
| 2019/0036611 A1* | 1/2019 | Fujita | H04B 10/50575 |

FOREIGN PATENT DOCUMENTS

| | | |
|---|---|---|
| CN | 103226251 A | 7/2013 |
| CN | 105099558 A | 11/2015 |
| CN | 106031058 A | 10/2016 |
| CN | 106716878 A | 5/2017 |
| CN | 107210821 A | 9/2017 |

* cited by examiner

*Primary Examiner* — Chad H Smith
(74) *Attorney, Agent, or Firm* — Blank Rome LLP

(57) ABSTRACT

An optical Mach-Zehnder superstructure modulator and method that can simultaneously linearize in-phase and quadrature components of optically modulated optical signals and reduce the modulated optical insertion loss (MOIL) by in-phase addition of the in-phase and quadrature components of an amplitude and/or phase modulated optical signal using two high-speed phase modulators embedded in the optical Mach-Zehnder superstructure modulator.

23 Claims, 11 Drawing Sheets

| SYMBOL | $\Phi_i(t)$ | $\Phi_q(t)$ | E | $I=|E|^2$ |
|---|---|---|---|---|
| 00 | 0 | 0 | $\frac{1}{\sqrt{2}}\cdot(1+j)$ | 1.0 |
| 01 | 0 | $\pi$ | $\frac{1}{\sqrt{2}}\cdot(1-j)$ | 1.0 |
| 10 | $\pi$ | 0 | $\frac{1}{\sqrt{2}}\cdot(-1+j)$ | 1.0 |
| 11 | $\pi$ | $\pi$ | $\frac{1}{\sqrt{2}}\cdot(-1-j)$ | 1.0 |

500

| Symbol | $\Delta\Phi_i(t)$ | $\Delta\Phi_q(t)$ | $\Delta\Phi(t)$ | $\Delta\tilde{\Phi}(t)$ | $\Delta\tilde{\Phi}_I(t)/2$ | $\Delta\tilde{\Phi}_Q(t)/2$ | E | $I=|E|^2$ |
|---|---|---|---|---|---|---|---|---|
| 00 | 0 | 0 | 0 | 0 | $\pi/4$ | $-\pi/4$ | $1+j$ | 2.0 |
| 01 | 0 | $\pi$ | $\pi$ | 1 | $-\pi/4$ | $\pi/4$ | $1-j$ | 2.0 |
| 10 | $\pi$ | 0 | $\pi$ | 1 | $-\pi/4$ | $\pi/4$ | $-1+j$ | 2.0 |
| 11 | $\pi$ | $\pi$ | 0 | 0 | $\pi/4$ | $-\pi/4$ | $-1-j$ | 2.0 |

| Symbol | Phase | Amplitude |
|---|---|---|
| 0000 | 225° | 0.33 |
| 0001 | 255° | 0.75 |
| 0010 | 195° | 0.75 |
| 0011 | 225° | 1.0 |
| 0100 | 135° | 0.33 |
| 0101 | 105° | 0.75 |
| 0110 | 165° | 0.75 |
| 0111 | 135° | 1.0 |
| 1000 | 315° | 0.33 |
| 1001 | 285° | 0.75 |
| 1010 | 345° | 0.75 |
| 1011 | 315° | 1.0 |
| 1100 | 45° | 0.33 |
| 1101 | 75° | 0.75 |
| 1110 | 15° | 0.75 |
| 1111 | 45° | 1.0 |

LINEARIZATION AND REDUCTION OF MODULATED OPTICAL INSERTION LOSS FOR QUADRATURE OPTICAL MODULATOR

CROSS REFERENCE TO RELATED APPLICATION

This application is a divisional of U.S. application Ser. No. 16/559,962 filed Sep. 4, 2019, which claims the benefit of U.S. Provisional Patent Application Ser. No. 62/727,979 entitled "Linearization and Reduction of Modulated Optical Insertion Loss for Quadrature Optical Modulator", filed on Sep. 6, 2018. The entire contents of both are herein incorporated by reference.

INTRODUCTION

Unless otherwise indicated herein, the materials described herein are not prior art to the claims in the present application and are not admitted to be prior art by inclusion in this section.

A modulated light wave is often used in high-speed optical communication systems to carry digital information from a sender to a receiver. In many systems, information is sent using both amplitude and phase modulation schemes. By using such techniques, in contrast to amplitude-only modulation, more information can be sent over the same optical frequency band. Examples include phase shift keying modulation techniques, such as Binary Phase Shift Keying (BPSK) and Quadrature Phase Shift Keying (QPSK), and Quadrature Amplitude Modulation (QAM) techniques, such as 8QAM, 16QAM and 64QAM realized using in-phase and quadrature modulator (IQM)

Insertion of an optical modulator, such as an IQM optical modulator, in an optical path creates insertion loss of the optical signal, thus impacting subsequent transmissions and receptions of the modulated signal. Furthermore, conventional amplification techniques may result in distortion to the various transmission symbols as represented by constellation points indicative of the modulated data. As such, there is a need for optical modulators with lower optical insertion loss and/or other features that improve the ability to receive the optical signal with high fidelity.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
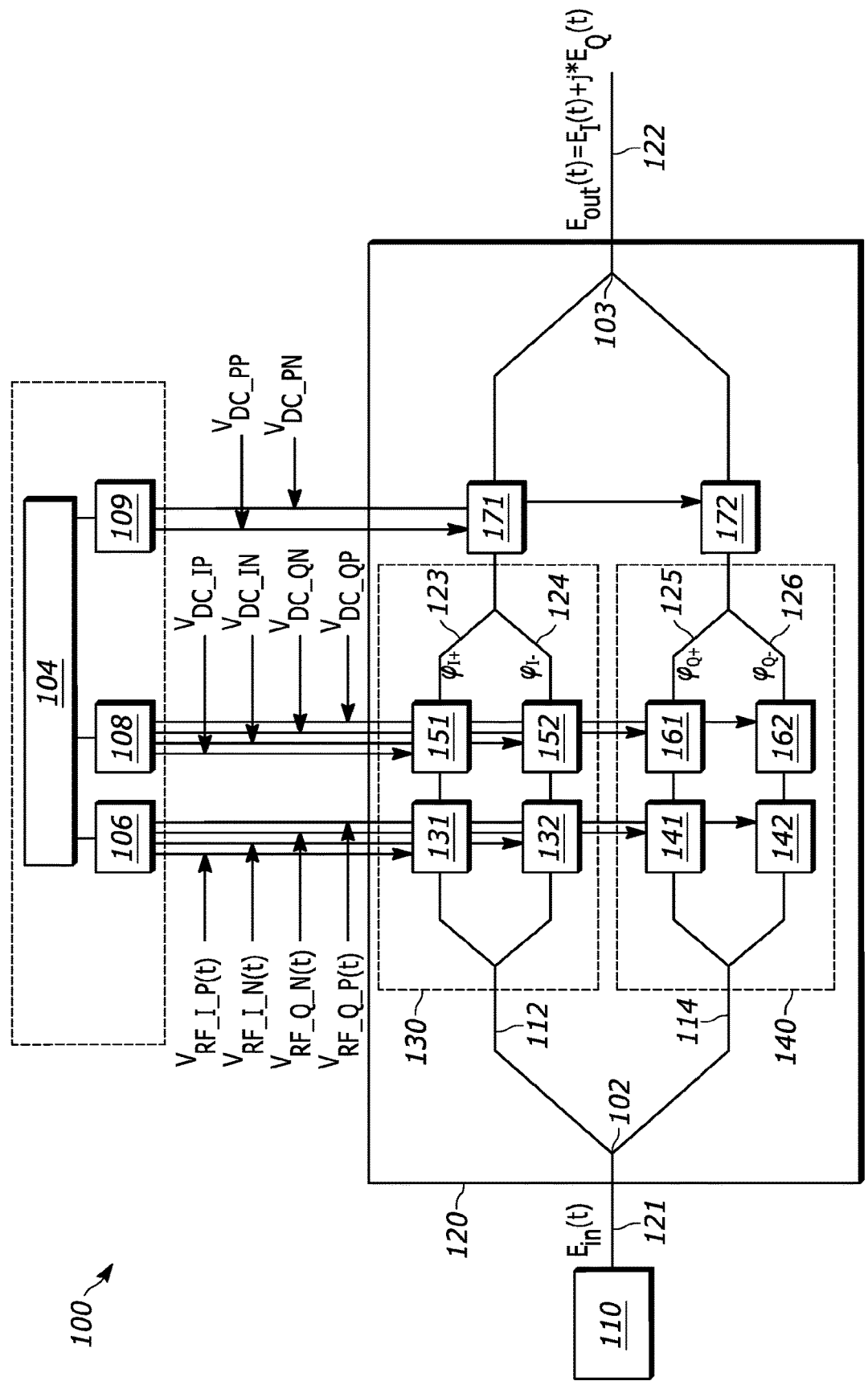
FIG. 1 illustrates a known in-phase and quadrature (IQ) Mach-Zehnder superstructure modulator system.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The present teaching describes a method to simultaneously linearize the in-phase and quadrature optical modulator and to reduce the modulated optical insertion loss (MOIL) by utilizing in-phase addition of the in-phase and quadrature components of an nQAM signal using two high-speed phase modulators embedded in a superstructure Mach-Zehnder modulator. Modulators of the present teaching may be realized in, for example, Lithium Niobate, Indium Phosphide, Gallium Arsenide, and Silicon Photonics technology.

The system and method of the present teaching relates to the linearization and/or reduction of modulated optical insertion loss (MOIL) for Mach-Zehnder-based in-phase quadrature optical modulators. More specifically, the systems and methods of the present teaching rely at least in part on the recognition that a coherent (phase-sensitive) optical signal combining approach can be used to reduce or eliminate the inherent modulated optical insertion loss present in known Mach-Zehnder-based in-phase quadrature optical modulators that rely on a non-coherent (phase-insensitive) optical signal combining approach. The system and method can advantageously linearize an output modulated optical signal produced by a Mach-Zehnder-based on in-phase quadrature optical modulator. Furthermore, the system and method of the present teaching can advantageously control and/or improve the distance between points of an output modulated optical signal constellation produced by a Mach-Zehnder-based in-phase quadrature optical modulator. This is sometimes referred to as a Hamming distance.

FIG. 1 illustrates a known IQ Mach-Zehnder superstructure modulator system 100. A light source 110 generates an optical signal. In some configurations, the generated optical signal may be, for example, a coherent optical light wave, also referred to as an optical carrier. In various configurations, the light source 110 may be a fixed wavelength or a tunable wavelength light source. The light source 110 is connected to an input 121 of a parent IQ Mach-Zehnder superstructure modulator 120. The optical signal at the input of the parent Mach-Zehnder modulator (MZM) 120 is split into two arms 112,114 of the parent MZM 120 by an optical splitter 102. The first arm 112 includes a child MZM 130 and the second arm 114 includes a child MZM 140. Child MZM 130 includes two arms 123, 124, and child MZM 140 includes two arms 125, 126.

Each child MZM 130, 140 includes a pair of modulation electrodes 131, 132, 141, 142, one for each arm 123, 124, 125, 126. Each child MZM 130, 140 also includes a pair of bias electrodes 151, 152, 161, 162 one for each arm 123, 124, 125, 126. The modulation and bias electrodes 131, 132, 141, 142, 151, 152, 161, 162 are configured in a differential drive configuration, which is sometimes referred to as a push-pull configuration, which provides a positive signal to one arm 123, 125 and a negative signal to the other arm 124, 126 of each child MZM 130, 140. The equal and opposite drive configuration advantageously reduces the peak voltage of a drive signal applied to the electrodes 131, 132, 141, 142, 151, 152, 161, 162 in order to produce a phase difference between modulated optical signals in arms 123, 124 or in arms 125, 126.

The modulation electrodes 131, 132, 141, 142 are connected to a modulation driver 106 that supplies RF modulation signals to a respective electrode 131, 132, 141, 142. For example, $V_{RF\_1\_P}(t)$, the positive RF modulation for the in-phase signal is applied to the modulation electrode 131 of child MZM 130 and $V_{RF\_1\_N}(t)$, the negative RF modulation for the in-phase signal is applied to the modulation electrode 132 of child MZM 130. The electrodes 131, 132 impart a modulation phase on the optical signal passing through the first arm 112 based on the applied modulation signal. The bias electrodes 151, 152, 161, 162 are connected to a bias driver 108 that supplies DC bias signals to respective bias electrodes 151, 152, 161, 162. For example, $V_{DC\_1\_P}$, the positive bias signal for the child MZM 130 is applied to bias electrode 151 and $V_{DC\_1\_N}$, the negative bias signal for the child MZM 130 is applied to bias electrode 152. In some configurations, the DC bias signals are configured to bias child MZM 130 at a minimum transmission point and to bias the child MZM 140 at a minimum transmission point.

Optical signals from the two arms 112, 114 of the parent MZM 130 are combined to generate a combined optical signal an output 122 by a combiner 103. The two arms 112,114 of the parent MZM 130 have bias electrodes 171, 172 that are connected to a bias driver 109 that supplies positive and negative DC bias signals to the bias electrodes 171, 172 to produce a bias phase for optical signals in each arm 112, 114 of the parent MZM superstructure 120. In some configurations, the DC bias signals are configured to bias the parent MZM superstructure 120 at a quadrature point by generating a π/2 phase difference between the optical signals generated in the first arm 112 and in the second arm 114.

The bias drivers 108, 109 and the modulation driver 106 are controlled by controller 104. In various configurations, bias drivers 108, 109, modulation driver 106 and/or controller 104 are constructed from one or more electrical circuits. In various configurations, the circuits can comprise FPGAs, ASICs, DSPs, ADCs, DACs and/or other discrete components and/or circuits, alone or in combination.

In some configurations, the modulation driver 106 and bias driver 108 are configured to produce ±1 DPSK modulation using RF modulation signals and DC bias signals so that one child MZM 130 imparts a modulation phase on an optical signal in response to a first modulation signal that results in an in-phase ±1 DPSK modulation on the optical signal passing through the first arm 112. The other child MZM 140 imparts a modulation phase on an optical signal in response to a second modulation signal that results in a quadrature ±1 DPSK modulation on the optical signal passing through the second arm 114. The parent MZM 120 multiplies the generated ±1 DPSK modulation in the second arm 114 by j by adding π/2 phase shift, thereby converting it to a quadrature modulation. The parent MZM 120 then adds the two DPSK modulations generated by the first and second arms 112, 114 to generate a QPSK or 4QAM modulation in one polarization.

The IQ MZM superstructure modulator system 100 may be used to implement multiple amplitude and phase-based modulation schemes. The particular modulation scheme depends on the particular multi-level signal with certain peak-to-peak voltage applied to the modulating child Mach-Zehnder modulators. For a superstructure Mach-Zehnder modulator, typically child Mach-Zehnder modulators are biased at the point of minimum transmission while parent Mach-Zehnder modulator is biased at the point of quadrature transmission.

Figures 2A, 2B:
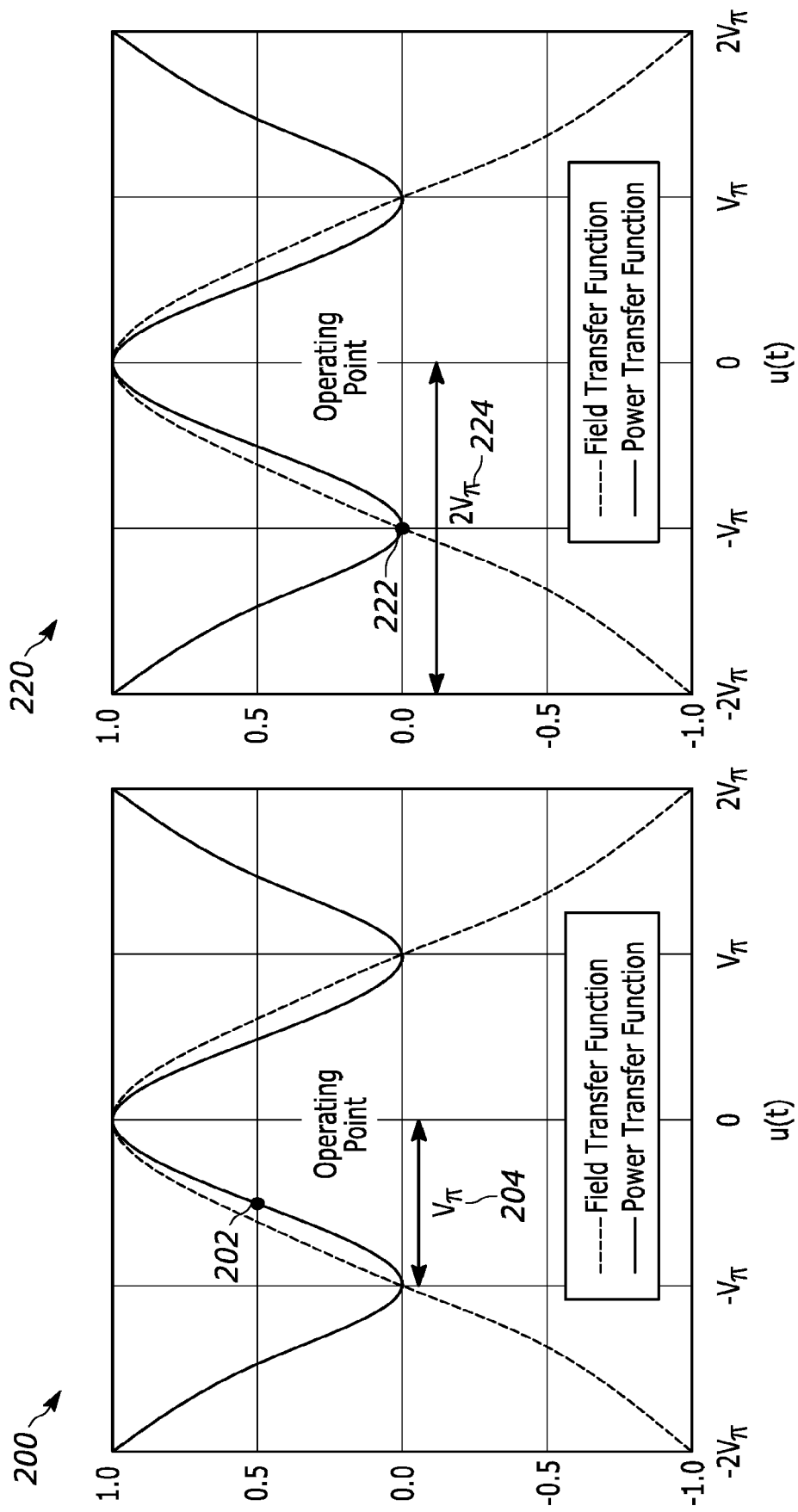
FIG. 2A illustrates a graph of a field transfer function (dashed line), a power transfer function (solid line), and an example operating point for a Mach-Zehnder modulator.
FIG. 2B illustrates a graph of a field transfer function (dashed line), a power transfer function (solid line), and another example operating point for a Mach Zehnder modulator.

FIG. 2A illustrates a graph 200 of a field transfer function (dashed line), a power transfer function (solid line), and an example operating point for a Mach-Zehnder modulator. This graph illustrates an operating point with a quadrature point bias 202, $V_{bias}=V_\pi/2$, and an applied modulation drive signal with a voltage swing 204 of $V_\pi$ peak-to-peak. As shown by the solid line power transfer function, this operating point bias 202 and voltage swing 204 provides an amplitude modulation from a zero state (no power out) to a one state (full output power). The power transfer function also illustrates how the quadrature point bias 202 is at the half power point of the modulator, which results in 3 dB inherent loss. Referring back to FIG. 1, similarly in some configurations, the parent Mach-Zehnder modulator 120 is biased at the point of quadrature transmission to introduce π/2 phase shift in the Mach-Zehnder superstructure.

FIG. 2B illustrates a graph 220 of a field transfer function (dashed line), a power transfer function (solid line), and another example operating point for a Mach Zehnder modulator. The graph 220 illustrates a minimum transmission bias 222, where the Mach-Zehnder is biased for nominally zero optical signal at the output. An input modulation signal voltage swing 224 of $2V_\pi$ peak-to-peak that produces a ±π phase transition in the optical signal is shown from the field transfer function curve. This operating point with a $2V_\pi$ voltage swing 224 at a minimum transmission operating point bias 222 also produces peak output power at each extreme of the applied voltage, as illustrated by the power transfer curve. Referring back to FIG. 1, this operating point may be used to produce, for example BPSK and/or DPSK signals from child Mach-Zehnder modulators 130 and 140.

Figure 2C:
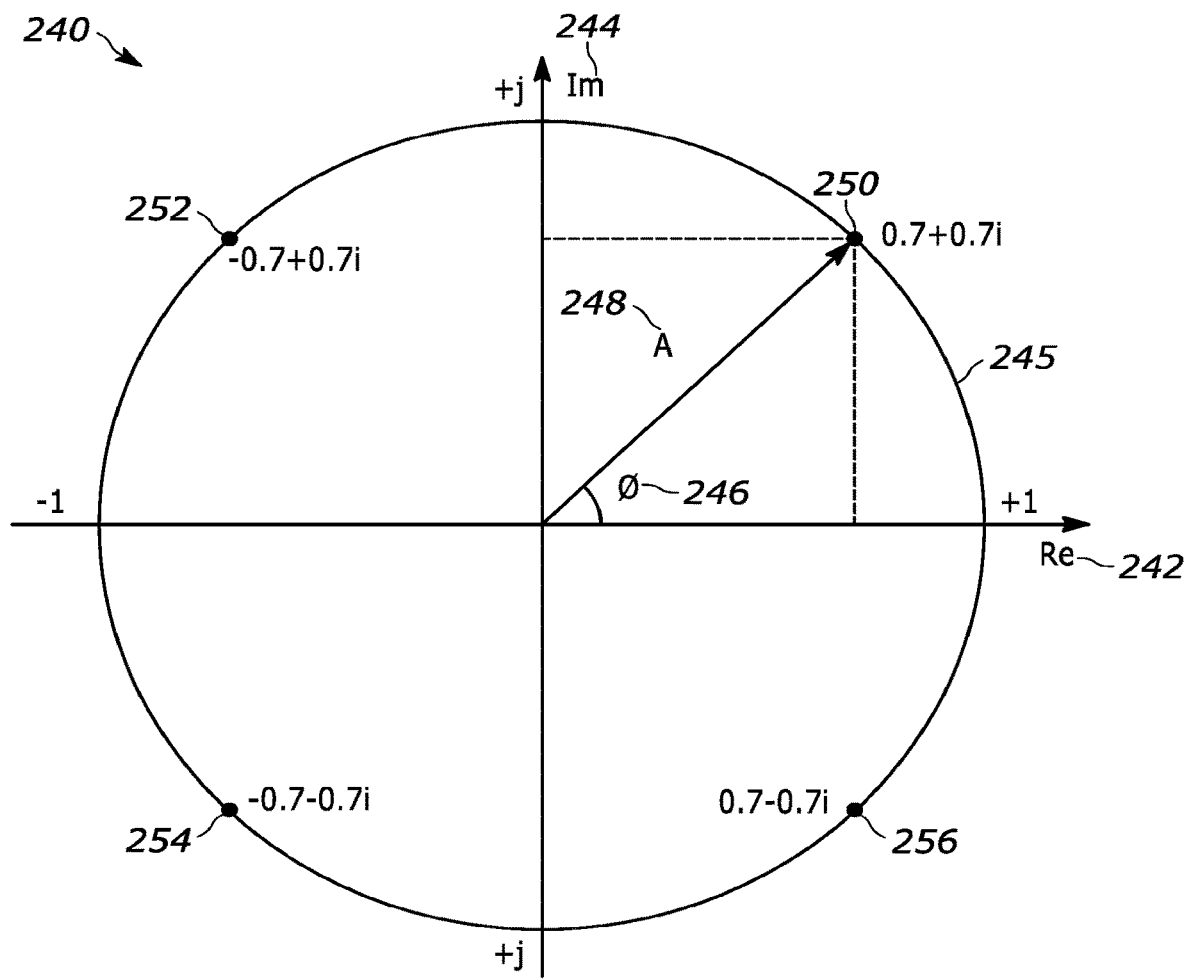
FIG. 2C illustrates a phase diagram representation of an output of a Mach-Zehnder modulator.

FIG. 2C illustrates a phase diagram 240 representation of an output of a Mach-Zehnder modulator. A phase diagram 240 helps to visualize the reachable signal space in the output of a Mach-Zehnder modulator. The phase diagram 240 includes a real axis 242 and an orthogonal imaginary axis 244. The circle 245 illustrates unity amplitude transmission and phase excursions of the modulated output signal, which is represented by the angle, ϕ, subtended from the positive real axis 242. A Mach-Zehnder modulator optical signal output generated by application of a phase modulating signal may be represented by a phase angle 246, ϕ, and an amplitude 248, A. Four example output signal points 250, 252, 254, 256 are shown as a specific example. Each of the points 250, 252, 254, 256 have unity amplitude but different phases. Specifically, the phases are: ϕ=45° for output 250, ϕ=135° for output 252, ϕ=215° for output 252, and ϕ=315° for output 252.

This set of four outputs 250, 252, 254, 256 can be demodulated in a coherent detector and thus information can be encoded on the optical signal by applying a modulating signal to realize one of these particular output points to code a particular symbol of the information being transmitted. With four distinct output points 250, 252, 254, 256 each point represents two bits of information encoded by a modulating signal. A modulation scheme relying on outputs with four different phases and equal amplitudes is referred to as QPSK. Other modulation schemes are possible, including schemes that use outputs with different amplitudes and different phases. Different amplitudes are represented by different diameter circles in a phase diagram. Various embodiments of the system and method of the present teaching can apply to one or more of these so-called coherent, or phase-sensitive, modulation schemes.

Figure 3A:
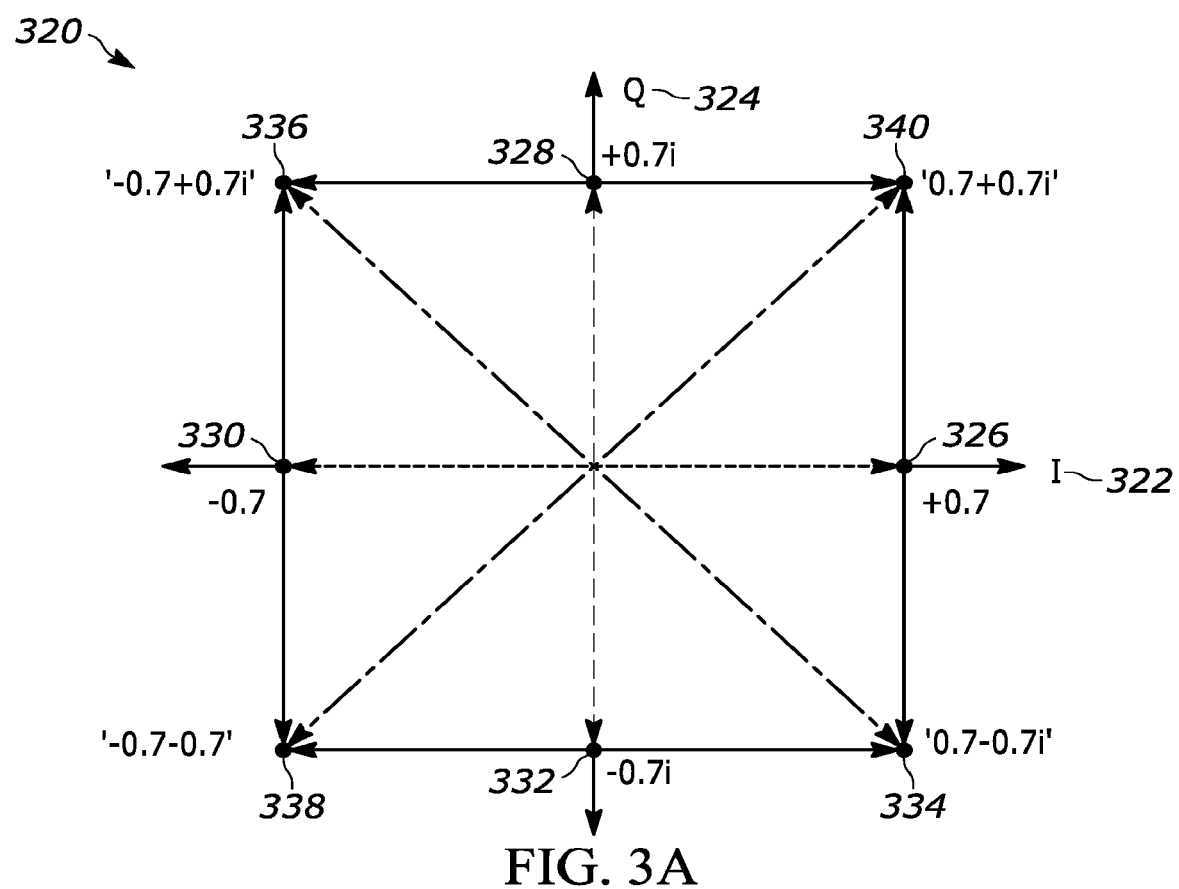
FIG. 3A illustrates a phase diagram representing outputs from a known in-phase and quadrature (IQ) superstructure modulator system.

FIG. 3A illustrates a phase diagram 320 representing the outputs from a known superstructure modulator system 100. To simplify the description of the present teaching, assume that all splitters split the power in equal halves and that all combiners take the same amount of power from each contributing path. In some configurations, numerous other splitting and recombination ratios can be used. Also, excess losses owing to, for example, material transmission losses of light through various elements are not included in the analysis.

Referring to FIGS. 1, 2A-C and 3A, both the in-phase child MZM 130 and the quadrature-phase child MZM 140 are biased at the point of minimum transmission (e.g. as illustrated in FIG. 2B) in intensity and generate the DPSK modulation by being driven by a modulating AC waveform with a peak voltage swing of ±1 $V_\pi$ or peak-to-peak voltage swing of 2 $V_\pi$. Further, the parent MZM 120 is biased at the quadrature point (e.g. as illustrated in FIG. 2A). This bias is provided differentially by the DC bias driver 109 that supplies $V_{DC\_P\_P}$ to bias electrode 171 and $V_{DC\_P\_N}$ to bias electrode 172. This bias shifts the phase in the second arm 114 by +90 degrees with respect to the first arm 112. The resulting output signal is the constellation of points 334, 336, 338, 340 shown in FIG. 3A. The quadrature bias point of the parent MZM 120 inherently creates a 3 dB insertion loss since the in-phase and quadrature modulated signals are simultaneously present at the output of the superstructure modulator. This is clear from the power transfer function of FIG. 2A.

The field at the output of the MZM superstructure system 100 may be described mathematically as:

$$E = \frac{E_0}{\sqrt{2}}\left[\Re\left(\exp\left(j\left(\varphi_I(t) - \frac{\pi}{2}\right)\right)\right) \pm \exp(j\Delta\Phi) \cdot \Re\left(\exp\left(j\left(\varphi_Q(t) - \frac{\pi}{2}\right)\right)\right)\right]$$

$$E = \frac{E_0}{\sqrt{2}}\left[\Re\left(\exp\left(j\left(\varphi_I(t) - \frac{\pi}{2}\right)\right)\right) \pm j \cdot \Re\left(\exp\left(j\left(\varphi_Q(t) - \frac{\pi}{2}\right)\right)\right)\right]$$

where $\varphi_I(t) = \pi\frac{V_I(t)}{2V_\pi}$, $V_I(t) = \pm V_\pi$ and $\varphi_Q(t) = \pi\frac{V_Q(t)}{2V_\pi}$, $V_Q(t) = \pm V_\pi V_I(t) = V_I(t) = V_{RF\_I\_P}(t) - V_{RF\_I\_N}(t)$, $V_Q(t) = V_Q(t) = V_{RF\_Q\_P}(t) - V_{RF_{Q_N}}(t)$, and $\Re()$ takes a real part of a complex signal within the parenthesis. The voltage $V_\pi$, also referred to as $V_{pi}$, is the drive voltage that is required to produce a phase shift of π rad on the optical signal. The ±1 in the field corresponds to 0 or π rad phase shifts in the optical E-field modulated at the output of the in-phase or first arm 112 of the parent MZM 120 due to the data modulation ϕ₁(t). The output points for $V_1(t)=\pm V_\pi$ are shown as signal points 326, 330 in the phase diagram 320 and produce a DPSK signal at the output of the child MZM 130. Similarly, the ±1 in the field corresponds to 0 or π rad phase shifts in the optical E-field modulated at the output of the quadrature or second arm 114 of the parent MZM 120 due to a data modulation ϕ_Q(t). The output points for $V_Q(t)=\pm V_\pi$ are represented by signal points 328,332 in the phase diagram 320 and produce a DPSK signal at the output of the child MZM 140. These two DPSK optical signals in each arm 112, 114 of the parent MZM 120 are combined at the output. A quadrature bias signal from bias driver 109 is applied to the arms 112,114 via bias electrodes 171, 172.

Mathematically, this is the j that multiplies the field for the quadrature modulated signal. The quadrature bias results in an additional phase difference of $\Delta\phi=\pi/2$, which orthogonalizes the two DPSK signals, producing the points of a QPSK constellation, points 334, 336, 338, 340.

Figures 3B, 3C:
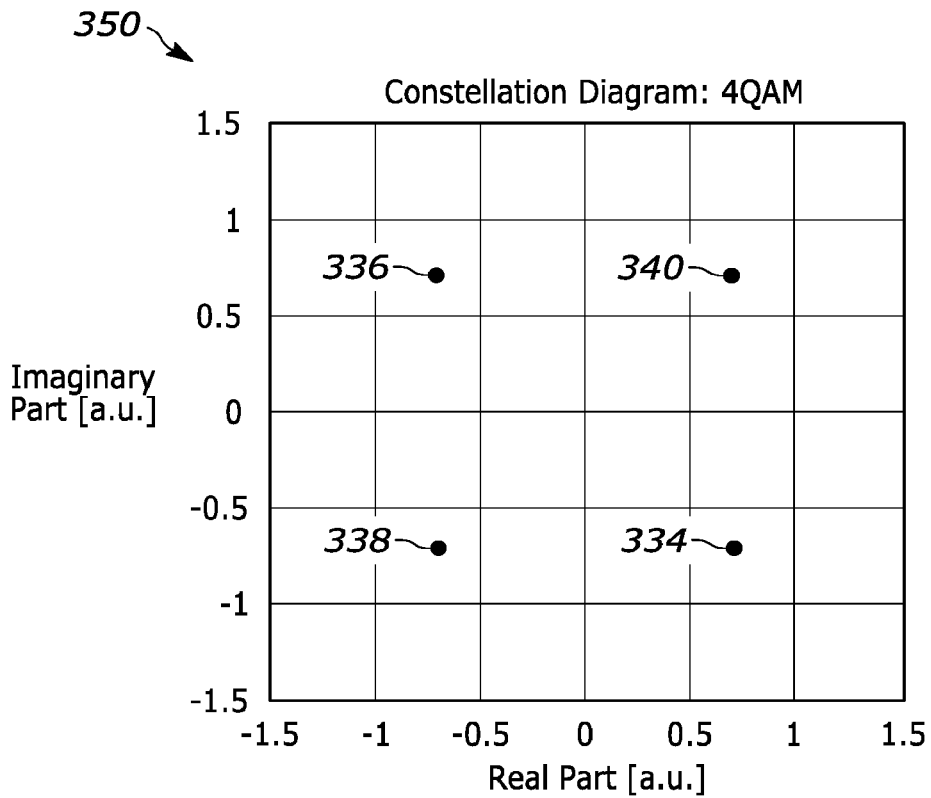
FIG. 3B illustrates a constellation diagram for a Mach-Zehnder superstructure modulator configured for 4QAM/QPSK operation.
FIG. 3C illustrates a table that includes a truth table and field and intensity values at the output for a Mach-Zehnder superstructure modulator configured for 4QAM or QPSK modulation.

FIG. 3B illustrates a constellation diagram 350 for the Mach-Zehnder superstructure modulator 100 as configured for 4QAM/QPSK operation. The four quadrature addition symbols are shown as points 334, 336, 338, 340. The points 334, 336, 338, 340 each exhibit a separation from the plot origin of ±0.7±0.7j. Depending on the fidelity of the channel through which the symbols are transceived, a received symbol may vary from the ideal position of points 334, 336, 338, 340. The received signal fidelity is related to the ability of the receive processor to identify a symbol correctly. That is, to identify which of the four constellation points 334, 336, 338, 340 was sent. Accordingly, additional separation between symbols provides additional design margins.

As described above, the four constellation points allow encoding of two bits per symbol, or point 334, 336, 338, 340. FIG. 3C illustrates a table 300 that includes a truth table and field and intensity values at the output for a Mach-Zehnder superstructure modulator 100 as configured for 4QAM/QPSK operation. Table 300 illustrates the symbol, the phase modulation signal value for the I modulator (child MZM 130) $\phi_I(t)$, the phase modulation signal value for the Q modulator (child MZM 140) $\phi_Q(t)$, the electric field, E, at the output of the parent MZM 120, and the intensity, I, at the output of the parent MZM 120.

The value of I=1.0 in the table 300 demonstrates the 3 dB inherent loss from the quadrature bias of the parent MZM 120. This is a manifestation of the fact that the in-phase and quadrature modulated signals are simultaneously present independent of time at the output of the parent MZM 120. The quadrature addition combiner effectively "dumps" half of the intensity away from the output for each symbol transmitted into Mach-Zehnder superstructure substrate. Thus, these known configurations of MZM superstructure modulator systems 100 have an inherent 3 dB modulated optical insertion loss (MOIL).

Figure 4:
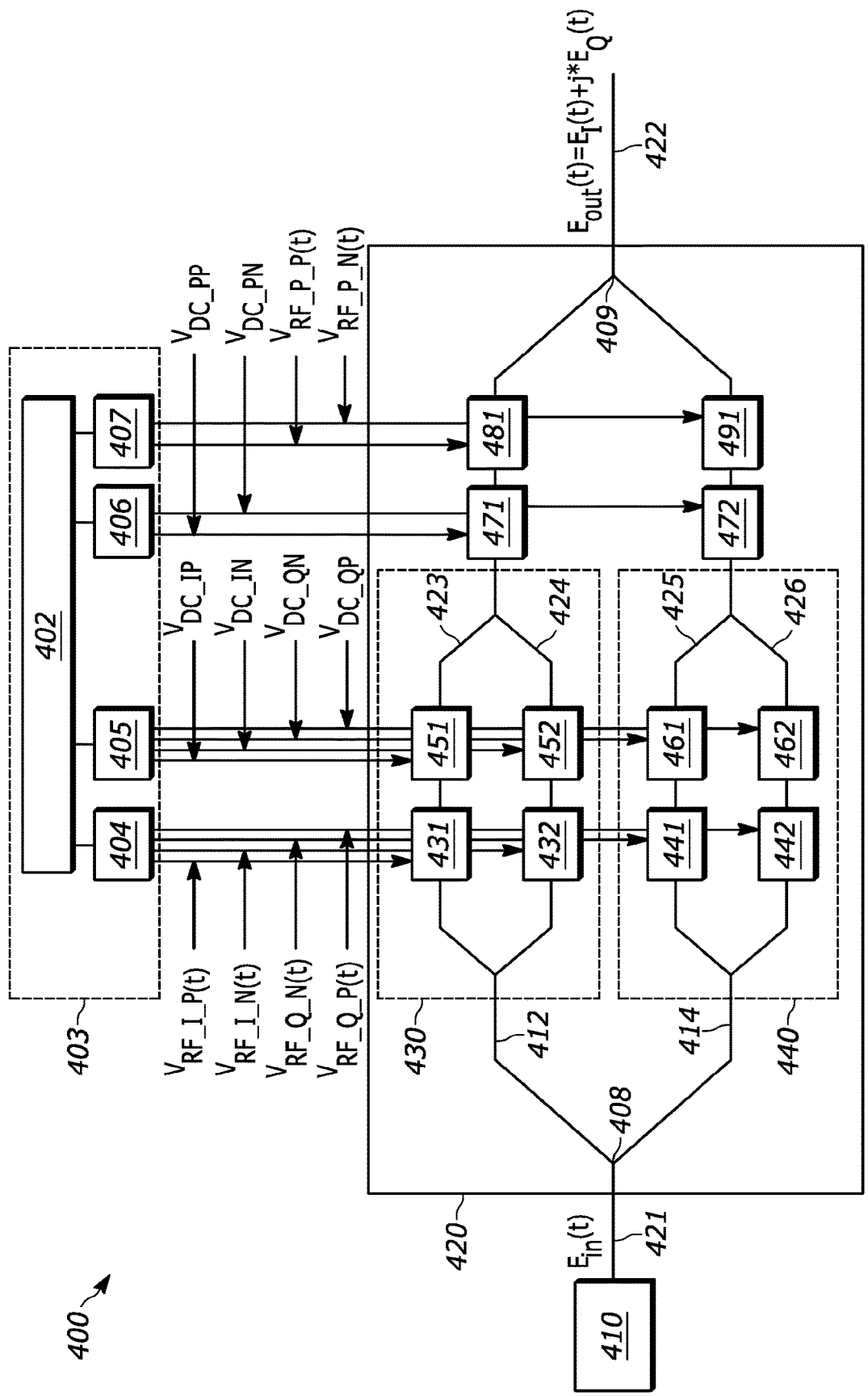
FIG. 4 illustrates an embodiment of an IQ Mach-Zehnder superstructure modulator system of the present teaching.

FIG. 4 illustrates an embodiment of an IQ Mach-Zehnder superstructure modulator system 400 of the present teaching. The superstructure modulator system 400 includes many of the same or similar components of the superstructure modulator system 100 described in connection with FIG. 1. One feature of the present teaching is that the superstructure modulator system 400 reduces and/or eliminates the inherent MOIL in the known superstructure modulator system 100 by using an AC bias scheme. The IQ Mach-Zehnder superstructure modulator 400 has a light source 410 that generates an optical signal, $E_{in}(t)$ 421, that may be, for example, an optical carrier. A parent MZM 420 includes two arms 412, 414. The optical signal at the input of the parent MZM 420 is split into two arms 412, 414 of the parent MZM 420 by an optical splitter 408. The optical splitter 408 can be a 50/50 splitter or can have numerous other splitting ratios in various embodiments. The first arm 412 includes a child MZM 430 and the second arm 414 includes another child MZM 440. Each child MZM 430, 440 includes a pair of arms 423, 424, 425, 426 with a respective pair of modulation electrodes 431, 432, 441, 442 and a respective pair of bias electrodes 451, 452, 461, 462. The modulation electrodes 431, 432, 441, 442 impart a modulation phase on the optical signal in respective arms 423, 424, 425, 426 in response to a modulation signal. The bias electrodes 451, 452, 461, 462 impart a bias phase on the optical signal in respective arms 423, 424, 425, 426 in response to a bias signal.

In some embodiments, the modulation and bias electrodes 431, 432, 441, 442, 451, 452, 461, 462 are configured in a differential drive configuration. Modulation electrodes 431, 432, 441, 442 are connected to a modulation driver 404 that supplies RF modulation signals that impart a modulation phase on the optical signal passing through the arms 423, 424, 425, 426. Bias electrodes 451, 452, 461, 462 are connected to a bias driver 405 that supplies bias signals. The child MZMs 430, 440 impart a modulation phase on the optical signals passing through arms 412, 414 in response to modulation signals applied to the modulation electrodes 431, 432, 441, 442.

Optical signals from the two arms 412, 414 of the parent MZM 420 are combined to an output 422 at a combiner 409. Parent MZM 420 has DC bias electrodes 471, 472 on each arm 412, 414 that are connected to a DC bias driver 406 and AC bias electrodes 481, 491 connected to AC bias driver 407. The DC and AC bias electrodes 471, 472, 481, 491 impart respective DC and AC bias phases on optical signals passing through respective arms 412, 414. AC bias electrode 481 modulates the optical signal in arm 412 with a bias signal that may operate at a high rate, and thus acts as a high-speed modulator. The AC bias electrode 491 modulates the optical signal in arm 414 with a bias signal that may operate at a high rate, and thus acts as a high-speed modulator. This is in contrast to the DC bias electrodes 471, 472 on each arm 412, 414 that impart a nominally constant bias phase. Thus, in some embodiments, the AC bias electrodes 481, 491 are constructed differently from the DC bias electrodes 471, 472 to support modulation of high-speed signals.

A controller 402 controls the modulation drivers 404, 405 and the bias drivers 406, 407. Collectively, the drivers 404, 405, 406, 407 and controller 402 may be referred to as a control device 403. In various embodiments, bias drivers 406, 407, modulation drivers 404, 405 and/or controller 402 are constructed from one or more electrical circuits. In various embodiments, the circuits may comprise FPGAs, ASICs, DSPs, ADCs, DACs, and/or other discrete circuits, alone or in combination.

One feature of the present teaching is that both a DC bias signal and an AC bias signal are applied to the parent MZM 420. This allows for a DC bias that is nominally constant over time, as well as an AC bias that changes with time. For example, the AC bias may change based on the modulation signal. Thus, the AC bias signal may operate at RF frequencies. The AC bias signal rate may track, for example, the data rate, and/or the symbol rate, of the applied RF data modulation signal. In some embodiments, the AC bias signal may change based on a particular symbol being encoded in a constellation of a phase modulated signal. For example, referring back to the constellation diagram 350 of the 4QAM modulation signal described in connection with FIG. 3B, in some embodiments the AC bias signal depends on which point 334, 336, 338, 340 of the constellation is being generated by the modulating signal. Said another way, and referring back to table 300 described in connection with FIG. 3C, in some embodiments the AC bias signal depends on which symbol of the truth table is being applied by the modulating signal. As described further below, this feature of including an AC bias signal applied through AC bias electrodes to produce and apply data dependent AC bias phase on a superstructure MZM can result in a reduced MOIL, improved constellation Hamming distance, and/or improved linearity of the superstructure MZM 400 and represent a significate improvement over the state-of-the-art.

Modulation signals are fed to each modulation electrode 431, 432, 441, 442. The signals are supplied by the driver 404 and selected by the controller 402. The respective modulation signals correspond to I and Q data streams provided from a data feeding source, such as a programmable controller (not shown) or other source. Respective bias signals are fed to some or all of bias electrode 451, 452, 461, 462, 471, 472, 481, 491 as selected by the controller 402 and supplied by the drivers 405, 406, 407. A look-up table associated with the controller 402 can be used to store any or all of the data-dependent AC bias and/or DC bias values used to generate bias signals for the various bias electrodes described herein. In some embodiments, the electrodes can be driven directly by high-speed digital-to-analog converters.

In some embodiments, the DC bias signals are configured by the controller 402 to bias the child MZM 430 in the first arm 412 at a minimum transmission point and to bias the child MZM 440 in the second arm 414 at a minimum transmission point. In some embodiments, the controller 402 configures the driver 404 such that the RF modulation signals for both child modulators 430, 440 supply a differential voltage of $\pm V_\pi$, which results in a $2V_\pi$ peak-to-peak voltage swing. In some embodiments, the RF modulation signals for both child modulators 430, 440 are configured to supply a differential voltage of $\pm V_\pi/2$, which results in a $1V_\pi$ peak-to-peak voltage swing for each child MZM 430, 440.

In one embodiment according to the present teaching, the child MZM 430 modulation electrodes 431,432 are differential RF electrodes for in-phase data modulation. The child MZM 440 electrodes 441,442 are differential RF electrodes for quadrature data modulation. The bias electrodes 451,452 are differential in-phase DC bias electrodes for child MZM 430. The bias electrodes 461,462 are differential quadrature DC bias electrodes for child MZM 440. The DC bias electrodes 471, 472 are differential DC bias electrodes for the parent MZM 420. Also, the AC bias electrodes 481, 491 are complementary RF electrodes for modulating data-dependent phase shifts for AC bias of parent MZM 420.

In some embodiments, the AC bias causes the part of the quadrature phase shift for the parent MZM 420 to include a data-modulation-dependent phase shift $\Delta\phi$ in addition to a fixed, time-independent, DC bias phase shift of $\Delta\phi=\pi/2$. This is a similar concept to that for which an AC signal rides on top of a DC signal. Following this analogy, the root-mean square (rms) value of this AC modulation imposed on the quadrature phase bias, $\Delta\phi=\pi/2$, is what reduces the insertion loss to either less than 3 dB, or eliminates it completely (0 dB). This is achieved because the varying bias results in an in-phase addition, which is also referred to as coherent addition, of the in-phase and quadrature optical signals produced by child MZM 430 and child MZM 440, respectively. This is in contrast to known superstructure modulators that rely on conventional quadrature addition provided by a $\Delta\phi=\pi/2$ DC bias only, which is an incoherent addition of the I and Q signals. The AC bias on the parent modulator 420 of the IQ Mach-Zehnder superstructure modulator system 400 of the present teaching can provide up to a 3 dB reduction in MOIL as compared to an IQ Mach-Zehnder superstructure modulator systems without an AC bias applied to the parent modulator.

While the discussion associated with the embodiment of FIG. 4 is described in connection with a differential drive configuration, one skilled in the art will appreciate that numerous other drive configurations and electrode configurations can be used. For example, single electrode modulation schemes and/or single electrode bias configurations can also be used for any or all of the child MZMs 430, 440 and the parent MZM 420.

Figures 5A, 5B:
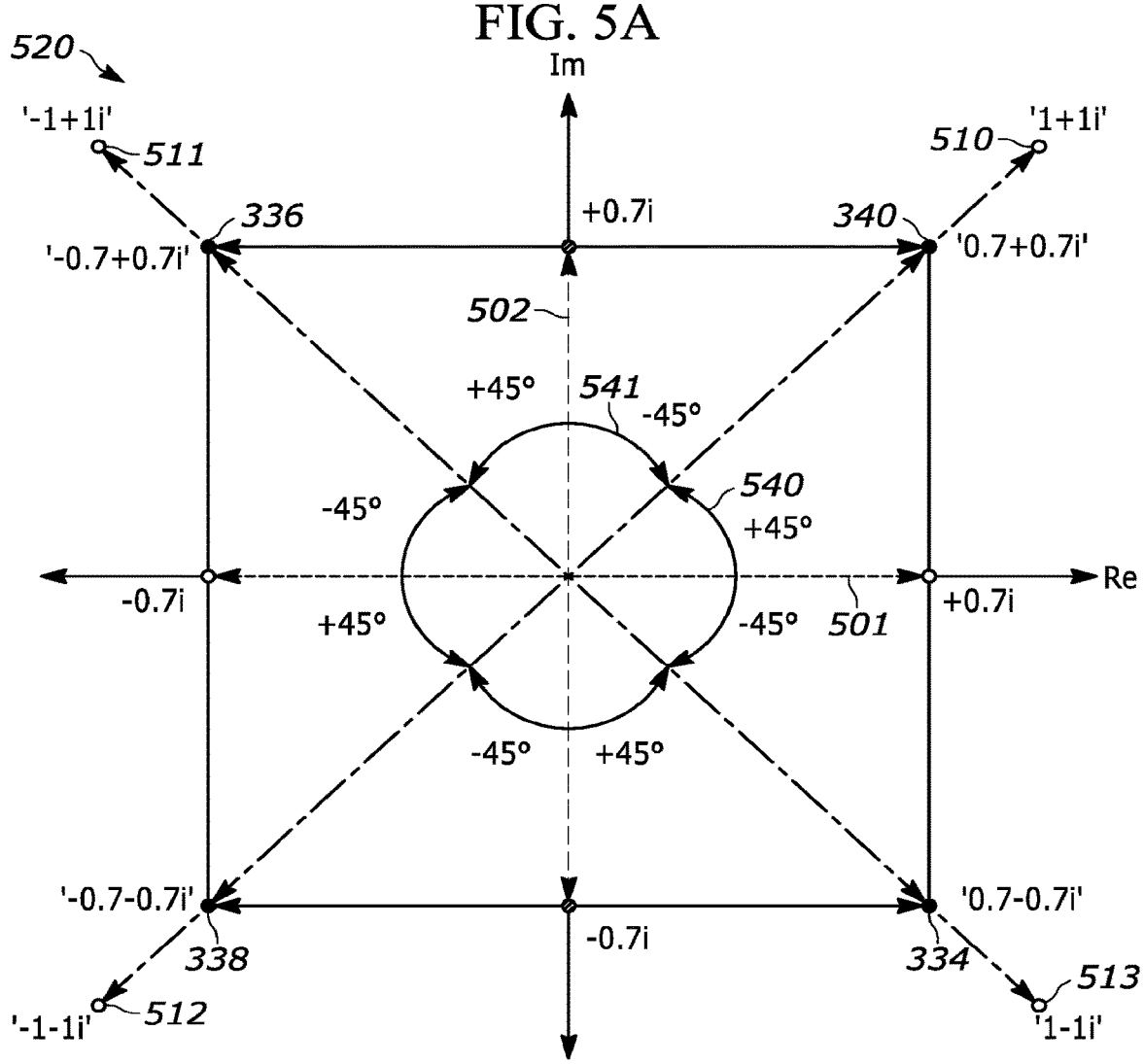
FIG. 5A illustrates a table including a truth table, DC and AC bias phase, and field and intensity values at an output for an embodiment of a Mach-Zehnder superstructure modulator configured for 4QAM operation of the present teaching.
FIG. 5B illustrates a phase diagram representing the modulated output signal for an embodiment of a Mach-Zehnder superstructure modulator configured for 4QAM operation of the present teaching and the output of a known 4QAM-configured Mach-Zehnder superstructure modulator.

FIG. 5A illustrates a table 500 including a symbol truth table, DC and AC bias phase, and field and intensity values at an output for an embodiment of a Mach-Zehnder superstructure modulator configured for 4QAM operation according to the present teaching. The table 500 illustrates a $2V_\pi$ applied modulation voltage method. Such a table can be associated with, for example, an embodiment of the IQ Mach-Zehnder superstructure modulator system 400 described in connection with FIG. 4 in which the child MZMs 430, 440 are biased at a minimum transmission and applied peak-to-peak modulation signal voltage is $2V_\pi$.

A mathematical description of operation is as follows. In the proposed scheme, as shown in table 500, each symbol of an applied modulation is associated with an applied phase value, $\Delta\tilde{\phi}(t)$ that is a logical XOR operation of the applied modulation phase for the in-phase modulator 430, $\Delta\phi_I(t)$, and the applied modulation phase for the quadrature modulator 440, $\Delta\phi_Q(t)$. The output field of modulator system 400 may be described by the following equations:

$$E = \frac{E_0}{\sqrt{2}}\left[\Re\left(\exp\left(j\left(\varphi_I(t)-\frac{\pi}{2}\right)\right)\right)\cdot\exp\left(j\pm\frac{\Delta\Phi}{2}\right)\pm\right.$$
$$\left.\exp(j\Delta\Phi)\cdot\exp\left(j\mp\frac{\Delta\Phi}{2}\right)\cdot\Re\left(\exp\left(j\left(\varphi_Q(t)-\frac{\pi}{2}\right)\right)\right)\right]$$

$$E = \frac{E_0}{\sqrt{2}}\left[\Re\left(\exp\left(j\left(\varphi_I(t)-\frac{\pi}{2}\right)\right)\right)\cdot\exp\left(j\pm\frac{\Delta\Phi}{2}\right)\pm\right.$$
$$\left.j\cdot\exp\left(j\mp\frac{\Delta\Phi}{2}\right)\cdot\Re\left(\exp\left(j\left(\varphi_Q(t)-\frac{\pi}{2}\right)\right)\right)\right]$$

where $\Delta\tilde{\phi}(t)\approx\Phi_I(t)\oplus\Phi_Q(t)$, and where $\oplus$ corresponds to a logical XOR operation. In addition, to getting an average of $$\Delta\tilde{\Phi}(t)\approx\frac{\pi}{2}, \Delta\tilde{\Phi}(t)=0 \text{ whenever } \frac{\Delta\Phi(t)}{2}=\pm\frac{\pi}{4}, \text{ and}$$

$$\Delta\tilde{\Phi}(t)=1 \text{ whenever } \frac{\Delta\Phi(t)}{2}=\mp\frac{\pi}{4}.$$

The table 500 presents the complex field, E, and the intensity, $I=|E|^2$ for each symbol in the 4QAM constellation.

FIG. 5B illustrates a phase diagram 520 representing output signal points for an embodiment of a Mach-Zehnder superstructure modulator configured for 4QAM operation according to the present teaching and a known 4QAM-configured Mach-Zehnder superstructure modulator. This phase diagram 520 illustrates a $2V_\pi$ applied peak-to-peak modulation voltage method. Referring both the table 500 described in connection with FIG. 5A and to the phase diagram 520 described in connection with FIG. 5B, the vectors 501, 502 represent one respective path each for a symbol "0", with vector 501 being the in-phase vector and vector 502 being the quadrature vector. Following along with the row for symbol "00", the in-phase vector 501 gets an AC-bias phase shift of $$+\frac{\pi}{4},$$

which is shown by a positive 45° phase angle 540, and the quadrature vector 502 is phase shifted by AC bias phase of $$-\frac{\pi}{4},$$

which is shown by a negative 45° phase angle 541. These vectors are then added "in-phase" to produce the symbol as point 510 with E=1+j. This is in contrast to a quadrature addition that results from no AC bias applied that leads to symbol 340 with E=0.7+0.7j similar to the example presented in connection with FIG. 3A. AC bias phases for the other symbols in the constellation that are provided in the table 500 described in connection with FIG. 5 are also shown. The phase rotations of the outputs of the child MZMs 430, 440 are data-dependent at the combiner of the parent MZM 420, as different applied symbols result in different biases applied to electrodes 481, 491, and the associated different phase shifts in each arm 412, 414 of the parent MZM 420.

Figure 5C:
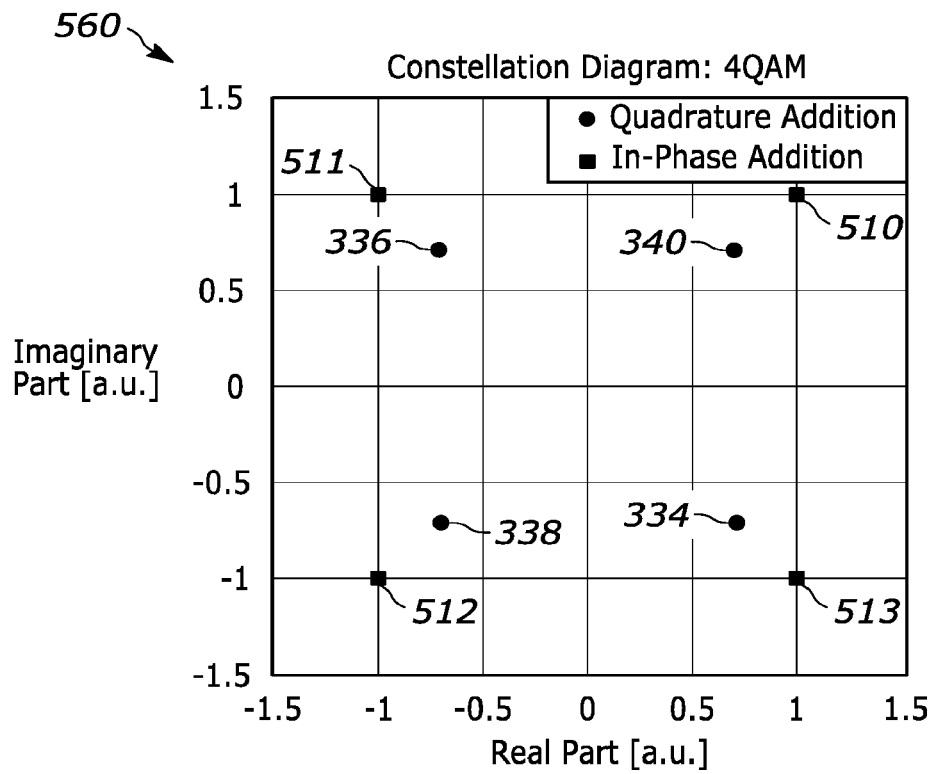
FIG. 5C illustrates a constellation diagram representing the modulated output signal for an embodiment of a Mach-Zehnder superstructure modulator configured for 4QAM operation according to the present teaching and the output of a known 4QAM-configured Mach-Zehnder superstructure modulator.

FIG. 5C illustrates a constellation diagram 560 representing the modulated output signal for an embodiment of a Mach-Zehnder superstructure modulator configured for 4QAM operation of the present teaching and a known 4QAM-configured Mach-Zehnder superstructure modulator. This phase diagram 520 illustrates a $2V_\pi$ peak swing applied modulation voltage embodiment. It is clear that the resulting points 510, 511, 512, 513 representing an output from a Mach-Zehnder superstructure modulator of the present teaching have higher amplitude transmission than corresponding points 334,336,338,340 for known superstructure modulators. The resulting MOIL improvement is calculated theoretically to be 3.01 dB. A simulation of the resulting MOIL yielded the same value. The in-phase addition symbol points 510, 511, 512, 513 each exhibit a separation from the plot origin of ±1.0±1.0j. Such an increase in the separation improves the signal strength for more robustly traversing a channel. Such an increase in the separation improves the ability of a coherent receiver to decode and correctly identify the transmitted symbols. Furthermore, the in-phase addition of the quadrature signals reduces the insertion loss associated with the modulator.

One feature of the methods and apparatus of present teaching is that it can be applied to numerous phase-based modulation schemes that are produced by MZM superstructure modulators. This includes the QPSK and 4QAM format described above. This also includes, for example, various nQAM modulation formats for which the value n can take on numerous values including, for example, n=4, 8, 16, 64, 256, etc. The modulated optical signal from a Mach-Zehnder superstructure modulator of the present teaching may carry information, for example, by means of symbols selected from a set of at least two, four, or more different symbols.

One aspect of the present teaching is that, in some embodiments certain advantages can be achieved when the in-phase and quadrature components of the nQAM signals are rotated using the AC bias phase in the two-dimensional complex plane (I–Q) by data dependent phase angles that are complementary to each other.

As described below in the description associated with FIGS. 6A-6C, the superstructure modulator 400 described in connection with FIG. 4 can also be used to generate even higher-order signal constellations such as 16QAM and 64QAM and/or to generate nQAM signals with high linearity and reduced MOIL. The system and method of the present teaching thereby relaxes the requirement of having a non-linear signal constellation analyzer as a last signal processing block on the receive-side digital signal processor to do decision operations on received symbols and perform symbol-to-bits mapping operations. These features can substantially reduce cost, complexity and/or size weight and power consumption of the receiver.

Figure 6A:
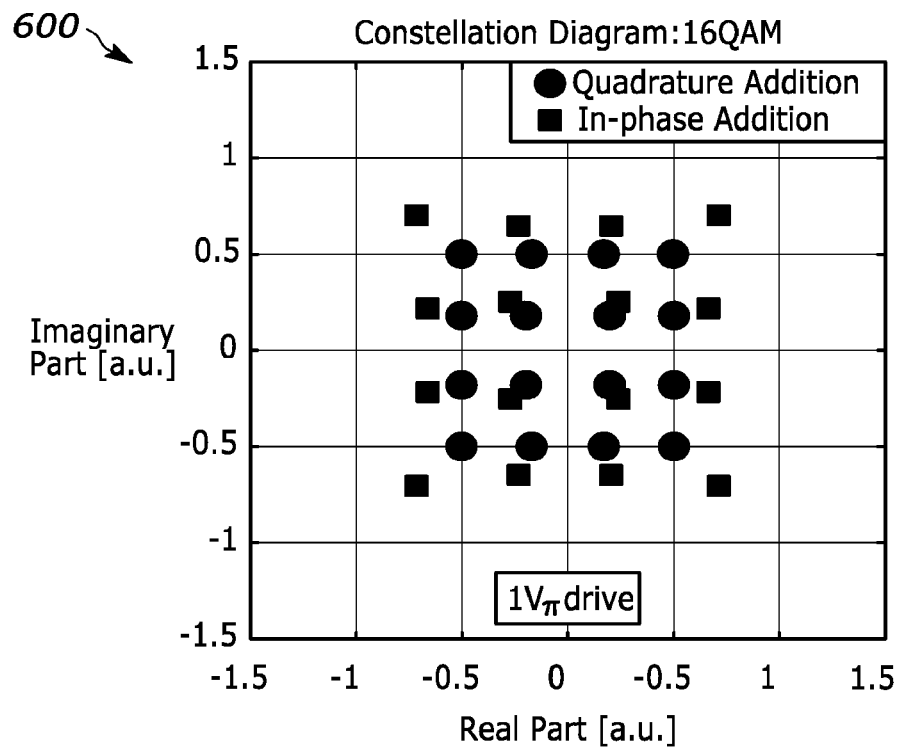
FIG. 6A illustrates a constellation diagram representing the modulated output signal for an embodiment of a Mach-Zehnder superstructure modulator configured for 16QAM operation with $1V_\pi$ drive operating point of the present teaching and a known 16QAM-configured Mach-Zehnder superstructure modulator.

FIG. 6A illustrates a constellation diagram 600 representing the modulated output signal for an embodiment of a Mach-Zehnder superstructure modulator configured for 16QAM operation with $1V_\pi$ drive operating point of the present teaching and a known 16QAM-configured Mach-Zehnder superstructure modulator. FIG. 6A illustrates an improvement for a 16QAM simulation where the insertion loss may be calculated by calculating 9.0/5.0=1.8 and using the equation 10*log 10(1.8)=2.55 dB (in theory) and 2.61 dB (in simulation) for a 1 $V\pi$ case. This corresponds to an MOIL improvement of 2.61 dB compared to MOIL of 8.55 dB. The MOIL of 8.55 dB includes 3 dB due to quadrature addition, +3 dB due to $1V_\pi$ under-drive, and +2.55 dB due to peak-to-average ratio of PAM4 signal.

Figure 6B:
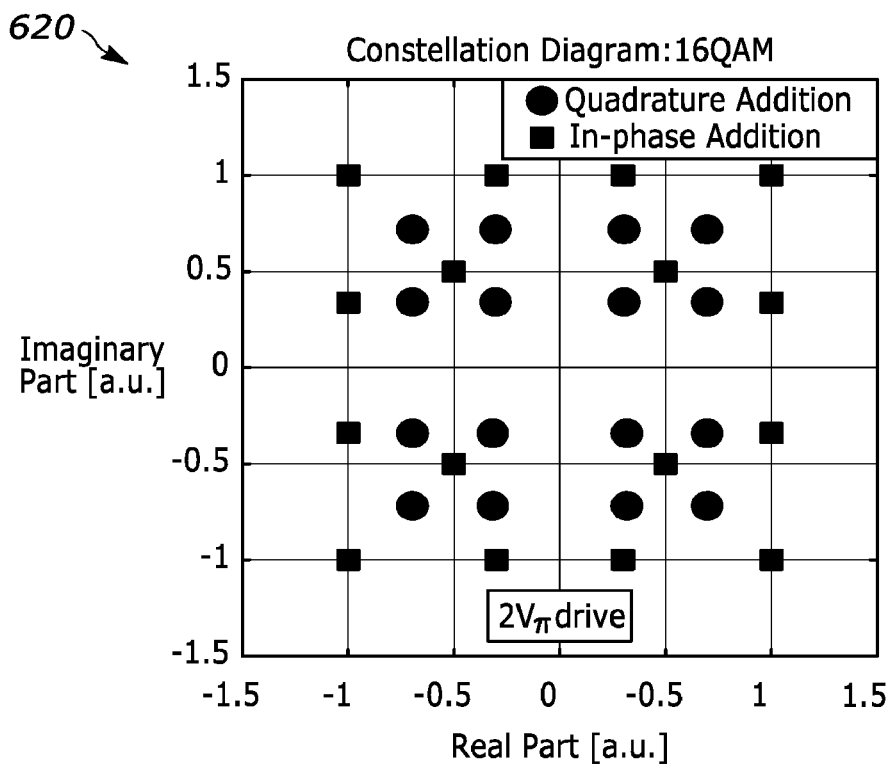
FIG. 6B illustrates a constellation diagram representing the modulated output signal for an embodiment of a Mach-Zehnder superstructure modulator configured for 16QAM operation with $2V_\pi$ drive of the present teaching and a known 16QAM-configured Mach-Zehnder superstructure modulator.

FIG. 6B illustrates a constellation diagram representing the modulated output signal for an embodiment of a Mach-Zehnder superstructure modulator configured for 16QAM operation with $2V_\pi$ drive of the present teaching and a known 16QAM-configured Mach-Zehnder superstructure modulator. FIG. 6B illustrates an improvement for a 16QAM simulation where the insertion loss may be calculated by calculating 9.0/5.0=1.8 and 3 dB+10*log 10(1.8)= 5.55 dB (in theory) and 5.79 dB (in simulation) for a 2V$\pi$ case. This corresponds to an MOIL improvement of 5.79 dB again compared to MIOL of 5.55 dB. However, the 1QAM constellation is somewhat distorted as 16QAM constellation points do not have equal Hamming distance.

Figure 6C:
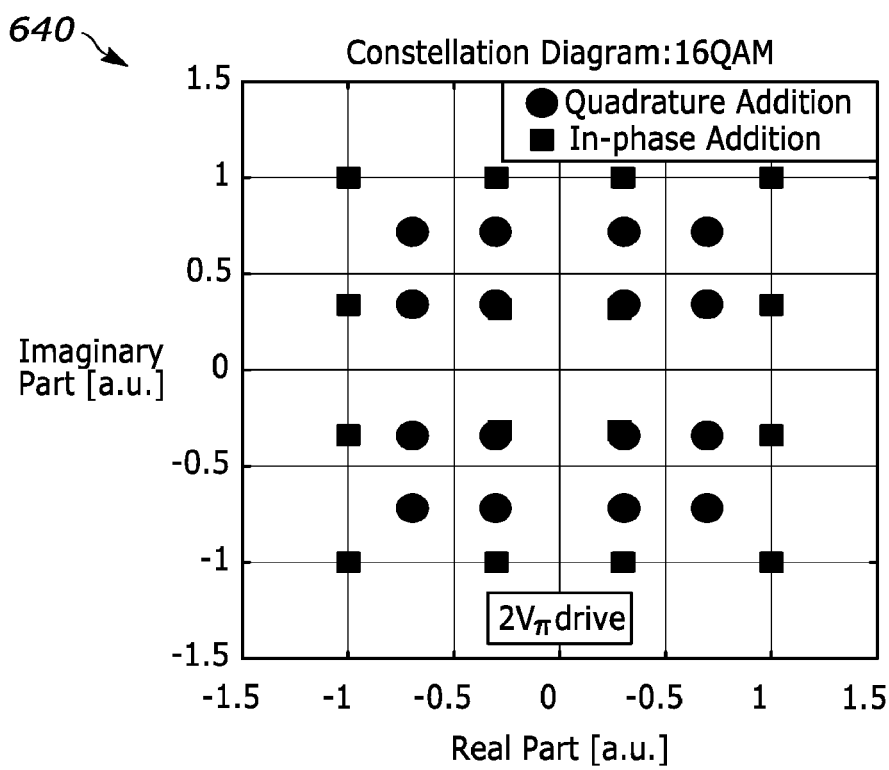
FIG. 6C illustrates a constellation diagram representing the modulated output signal for an embodiment of a Mach-Zehnder superstructure modulator configured for 16QAM operation with $2V_\pi$ drive and linearization of the present teaching and a known 16QAM-configured Mach-Zehnder superstructure modulator.

FIG. 6C illustrates a constellation diagram representing the modulated output signal for an embodiment of a Mach-Zehnder superstructure modulator configured for 16QAM operation with $2V_\pi$ drive and linearization of the present teaching and a known 16QAM-configured Mach-Zehnder superstructure modulator. The more linear signal constellation may be generated where signal constellation points have an equal Hamming distance of 2. This linearity improvement can, for example, improve the receiver sensitivity and/or make the system more tolerant of loss and noise. This configuration yields a 5.53 dB reduction in the MOIL compared to theoretical MOIL of 5.55 dB. In other words, we have recovered most of the lost signal power at the transmitter that is associated with prior art amplitude- and/or phase-based optical modulators. For some applications, a small increase in MOIL is well worth the associated improvement in linearity. FIGS. 6A-6C indicates that the symbols for the in-phase addition cases have maximum power transmission, which may be an advantage over other 16QAM modulation schemes.

The data-dependent phase shifts of the AC bias for the 4QAM or QPSK embodiments may be implemented as $$\pm\frac{\pi}{4},$$

which happens to be an equal and opposite configuration. This bias condition can still be referred to as a differential AC bias drive configuration although the RF drive signals are complementary because an equal and opposite bias phase is applied to the two arms 412, 414 of the parent MZM 420 whose sum is $$\frac{\pi}{2}.$$

In general, however, the data-dependent AC bias phase is not necessarily of the same magnitude for each arm 412, 414. Rather, in some embodiments, especially those with larger constellations, the AC bias phase is applied as a complementary phase bias. That is, the applied AC bias phase totals 90° so that an AC bias phase of X° is applied to one arm 412, and 90-X° is applied to the other arm 414. This is the case for signals that fall in the 0-90° quadrant of the phase diagram. The effect of the additional phase from the AC bias is to move a vector associated with the in-phase component of the desired symbol point and a vector associated with the quadrature component of the desired symbol point toward each other such that they add constructively "in-phase". Note that the differential AC bias drive of the 4QAM or QPSK embodiments is a special case of a complementary phase bias with equal magnitude.

Thus, for some embodiments, for example QPSK or 4QAM, for all four symbols the complementary phase shift of π/4 can be selected so that the total path phase shift of all four paths are equal. That is, the amplitudes of the applied phase biases are the same magnitude. In various other embodiments, in particular those with larger constellation size, the amplitude of the applied phase biases are not all the same magnitude. As the number of symbols increases, the applied bias phases generally increase in number. In practice, these applied biases can be predetermined and provided in a look up table that is accessed by the control device 403.

Figures 7A, 7B:
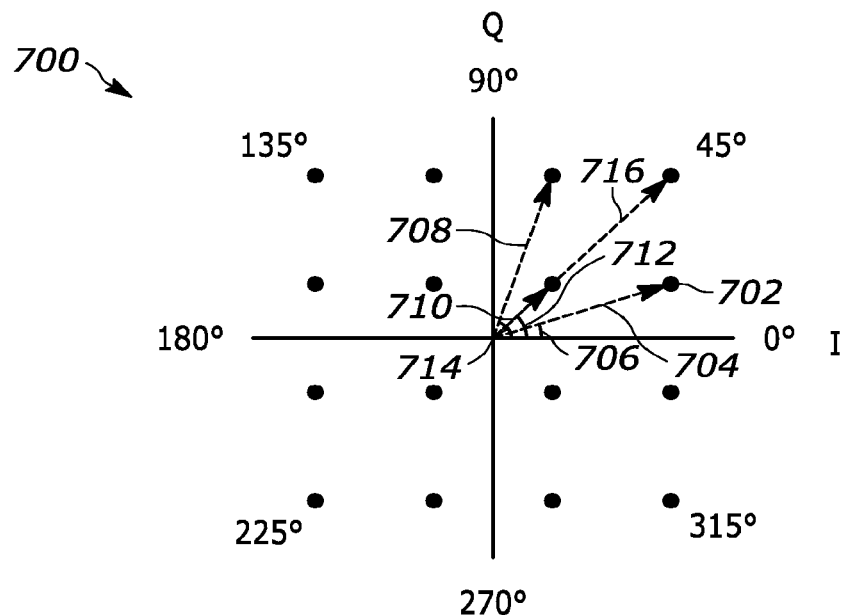
FIG. 7A illustrates a phase diagram for a 16QAM constellation.
FIG. 7B illustrates a table of symbols and associated phase and amplitude of the transmitted optical carrier representing the symbols of the phase diagram of FIG. 7A.

FIG. 7A illustrates a phase diagram 700 for a 16QAM constellation. FIG. 7B illustrates a table 750 of a symbol and associated phase and amplitude of the transmitted optical carrier representing the symbol associated with the phase diagram 700 of FIG. 7A. Retelling to both figures, symbol point 702 has a respective vector 704 with an amplitude and a phase angle 706. The vectors' 704, 708, 710, 716 amplitudes and phase angles 706, 712, 714 shown indicate that there are three phase angles 706, 712, 714 in each quadrant, for example, the three phase angles 706, 712, 714 of the 0-90-degree quadrant. Vector 710 and vector 716 have the same 45-degree phase angle 712. The points at the end of vectors 704, 708, 710, 716 represent the four symbols 752 shown in the table 750. It is possible to determine for each signal point, e.g. point 702, the complementary AC bias phase to be applied to each electrode 481, 491 for each of the four symbols 752 indicated in table 750. In some embodiments, this predetermined symbol-based complementary phase can be stored in a look up table that can be accessed by the control device 403.

One feature of the present teaching is that it can be applied to dual-polarization multiplexed IQ Mach-Zehnder modulators. Such modulators can advantageously provide twice the data capacity per optical carrier as compared to single polarization modulators.

Figure 8:
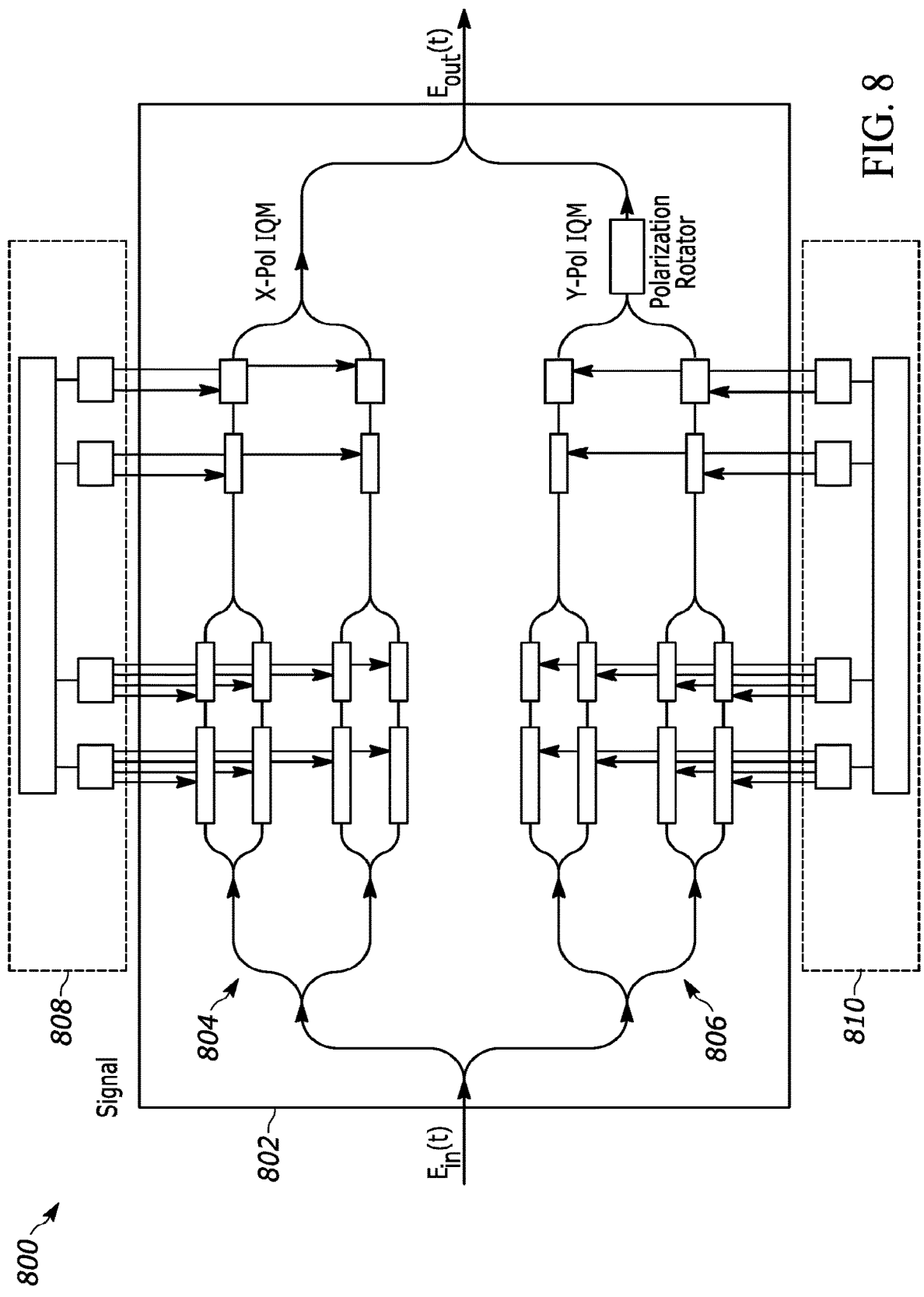
FIG. 8 illustrates an embodiment of a dual-polarization IQ Mach-Zehnder superstructure modulator system of the present teaching.

FIG. 8 illustrates an embodiment of a dual-polarization IQ Mach-Zehnder superstructure modulator system 800 of the present teaching. A dual-polarization IQ Mach-Zehnder superstructure 802 includes two IQ Mach-Zehnder superstructure modulators 804, 806, one in each arm of the dual-polarization IQ Mach-Zehnder superstructure 802. For example, these IQ Mach-Zehnder superstructure modulators 804, 806 can be the IQ Mach-Zehnder superstructure modulator 420 described in connection with FIG. 4. Each IQ Mach-Zehnder superstructure modulator 804, 806 is supplied modulation signals and bias signals by respective control devices 808, 810 that may be the same or similar to the control device 403 as described in connection with FIG. 4. An input optical carrier is split to supply an optical signal to each of the IQ Mach-Zehnder superstructure modulators 804, 806 in each arm of the dual-polarization IQ Mach-Zehnder superstructure 802. In various embodiments, each IQ Mach-Zehnder superstructure modulator 804, 806 generates a modulated optical signal that has reduced MOIL and/or improved linearization and/or improved Hamming distance as described herein by applying an AC bias to one or both of the superstructure modulators 804, 806. For example, this can be any of DPSK, QPSK, 8QAM, 16 QAM, 64 QAM or other phase modulated optical signals. A polarization rotator is used to rotate the output of the signal from IQ Mach-Zehnder superstructure modulator 806 to construct an output signal that includes modulated optical signals in two orthogonal polarizations at an output of the dual-polarization IQ Mach-Zehnder superstructure 802. This is sometimes referred to as a polarization multiplexed optical signal or a dual-polarization optical signal.

The system and method of the present teaching can be applied to MZMs that are fabricated using any of a variety know materials. For example, MZM modulators of the present teaching can be constructed using Lithium Niobate, Indium Phosphide, Gallium Arsenide, and/or Silicon Photonics technology. Some embodiments of the MZM superstructure in-phase and quadrature phase optical modulator may additionally include two child MZMs. The embodiments described herein can simultaneously improve linearity as well as reduce the MOIL due to, for example, quadrature addition loss, peak-to-average power ratio loss of electrical driving pulse amplitude modulation signals, and/or loss due to under-driving the child MZMs to generate nQAM signals.

Some embodiments of the system and method of present teaching include electrically driving the two high-speed phase modulators which rotate in-phase and quadrature-phase components of the nQAM signals in the complex plane (I-Q) by data dependent phase angles which are complementary to each other. Furthermore, some embodiments can implement an algorithm, described herein, to compute two-complementary phase angles for nQAM signal generation that allow electrically driving child in-phase and quadrature MZMs with a peak-to-peak voltage swing of $2V_\pi$, or a voltage swing between $1V_\pi$ and $2V_\pi$. Alternatively or additionally, some embodiments of the system and methods of the present teaching construct a look-up table that stores the two-complementary data-dependent phase angles on the transmit-side that is accessible to a digital signal processor that generates data-dependent phase angles at the baud rate using two high-speed digital-to-analog converters.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. An optical Mach-Zehnder superstructure modulator comprising:
   a) an optical splitter having an input configured to receive an input optical signal, the optical splitter splitting the received input optical signal to provide a first optical signal to a first optical path and a second optical signal to a second optical path;
   b) a first child Mach-Zehnder modulator (MZM) optically coupled to the first optical path, the first child Mach-Zehnder modulator imparting a first modulation phase on the first optical signal in response to a first modulation signal to produce a first modulation phase optical signal;
   c) a first high-speed optical modulator optically coupled to the first child MZM, the first high-speed optical modulator being configured to phase shift a first AC bias phase on the first modulation phase optical signal from the first child MZM in response to a first AC bias signal to produce a first AC phase bias optical signal;
   d) a second child Mach-Zehnder modulator (MZM) optically coupled to the second optical path, the second child Mach-Zehnder modulator imparting a second modulation phase on the second optical signal in response to a second modulation signal to produce a second modulation phase optical signal;
   e) a second high-speed modulator optically coupled to the second child MZM, the second high-speed modulator being configured to phase shift a second AC bias phase on the second modulation phase optical signal from the second child MZM in response to a second AC bias signal to produce a second AC phase bias optical signal;
   f) an optical combiner having a first input optically coupled to the first high-speed optical modulator and a second input optically coupled to the second high-speed optical modulator, the optical combiner combining the first and second AC phase bias optical signals from the first and second high-speed modulators to provide an output optical signal at an output; and
   g) at least one driver that provides the first modulation signal to the first child MZM, provides the second modulation signal to the second child MZM, provides the first AC bias signal to the first high-speed modulator, and provides the second AC bias signal to the second high-speed modulator, wherein the at least one driver is configured such that at least one of the first and second AC bias signal is a function of at least one of the first and second modulation signal.

2. The optical Mach-Zehnder superstructure modulator of claim 1 wherein the at least one driver is configured so that the first and second AC bias phases comprise complementary phase angles.

3. The optical Mach-Zehnder superstructure modulator of claim 1 wherein the at least one driver is configured so that at least one of the first and second AC bias phase comprises $$a + \frac{\pi}{4}$$

bias phase and the other of the first and second AC bias phase comprises a $$-\frac{\pi}{4}$$

bias phase.

4. The optical Mach-Zehnder superstructure modulator of claim 1 wherein the optical Mach-Zehnder superstructure modulator is configured at a quadrature bias point.

5. The optical Mach-Zehnder superstructure modulator of claim 1 wherein the at least one driver is configured so that at least one of the first and second modulation signal comprises a phase shift keying modulation signal.

6. The optical Mach-Zehnder superstructure modulator of claim 1 wherein the at least one driver is configured so that at least one of the first and second modulation signal comprises an in-phase phase shift keying modulation signal.

7. The optical Mach-Zehnder superstructure modulator of claim 6 wherein the at least one driver is configured so that the other of the first and second modulation signal comprises a quadrature phase shift keying modulation signal.

8. The optical Mach-Zehnder superstructure modulator of claim 1 wherein the at least one driver is configured so that at least one of the first and second modulation signal comprises an amplitude modulation signal.

9. The optical Mach-Zehnder superstructure modulator of claim 1 wherein the at least one driver is configured so that at least one of the first and second modulation signal comprises an in-phase amplitude modulation signal.

10. The optical Mach-Zehnder superstructure modulator of claim 9 wherein the at least one driver is configured so that the other of the first and second modulation signal comprises a quadrature phase amplitude modulation signal.

11. The optical Mach-Zehnder superstructure modulator of claim 1 wherein the at least one driver is configured so that at least one of the first and second modulation signal comprises a $V_\pi$ peak-to-peak voltage swing.

12. The optical Mach-Zehnder superstructure modulator of claim 1 wherein the at least one driver is configured so that at least one of the first and second modulation signal comprises a $2V_\pi$ peak-to-peak voltage swing.

13. The optical Mach-Zehnder superstructure modulator of claim 1 wherein at least one of the first and second high-speed optical modulator comprise an electrode configured to impart at least one of the first and second AC bias phase on at least one of the first and second modulation phase optical signal.

14. The optical Mach-Zehnder superstructure modulator of claim 1 wherein the at least one driver is configured so that at least one of the first and second AC bias signal changes based on a particular symbol encoded in at least one of the first and second modulation signal.

15. The optical Mach-Zehnder superstructure modulator of claim 1 wherein the at least one driver is configured so that at least one of the first and second AC bias signals are chosen to provide a desired modulated optical insertion loss (MOIL) of the optical Mach-Zehnder superstructure modulator.

16. The optical Mach-Zehnder superstructure modulator of claim 1 wherein the at least one driver is configured so that at least one of the first and second AC bias signals are chosen to provide a reduction of a modulated optical insertion loss (MOIL) of the optical Mach-Zehnder superstructure modulator.

17. The optical Mach-Zehnder superstructure modulator of claim 16 wherein the reduction of the modulated optical insertion loss (MOIL) of the optical Mach-Zehnder superstructure modulator comprises a 3 dB reduction of the modulated optical insertion loss (MOIL).

18. The optical Mach-Zehnder superstructure modulator of claim 1 wherein the at least one driver is configured so that at least one of the first and second AC bias signals are chosen to provide a desired linearity of the output optical signal.

19. The optical Mach-Zehnder superstructure modulator of claim 1 wherein the at least one driver is configured so that at least one of the first and second AC bias signals are chosen to provide a desired Hamming distance of the output optical signal.

20. The optical Mach-Zehnder superstructure modulator of claim 1 wherein the at least one driver comprises a look-up table that stores data-dependent phase angles.

21. The optical Mach-Zehnder superstructure modulator of claim 1 wherein the optical Mach-Zehnder superstructure modulator is constructed using at least one of Lithium Niobate, Indium Phosphide, Gallium Arsenide, or Silicon Photonics technology.

22. The optical Mach-Zehnder superstructure modulator of claim 1 wherein the at least one driver is configured so that the output optical signal comprises at least one of a DPSK, QPSK, 4QAM, 8QAM, 16 QAM, or 64 QAM optical signal.

23. The optical Mach-Zehnder superstructure modulator of claim 1 further comprising a second optical Mach-Zehnder superstructure modulator configured in parallel with the optical Mach-Zehnder superstructure modulator, wherein the output of the optical Mach-Zehnder superstructure modulator and an output of the second optical Mach-Zehnder superstructure modulator are combined with a combiner so as to generate a polarization multiplexed optical signal.

* * * * *